(12) United States Patent
Fellman et al.

(10) Patent No.: US 7,522,528 B2
(45) Date of Patent: Apr. 21, 2009

(54) LOW-LATENCY AUTOMATIC REPEAT REQUEST PACKET RECOVERY MECHANISM FOR MEDIA STREAMS

(75) Inventors: Ronald D. Fellman, San Diego, CA (US); John C. Beer, San Diego, CA (US)

(73) Assignee: QVidium Technologies, Inc., San Diego, CA (US)

( * ) Notice: Subject to any disclaimer, the term of this patent is extended or adjusted under 35 U.S.C. 154(b) by 570 days.

(21) Appl. No.: 11/282,238

(22) Filed: Nov. 18, 2005

(65) Prior Publication Data

US 2006/0104279 A1    May 18, 2006

Related U.S. Application Data

(60) Provisional application No. 60/629,509, filed on Nov. 18, 2004.

(51) Int. Cl.
*H04L 12/56* (2006.01)
(52) U.S. Cl. ........................ 370/236; 370/394; 370/410; 714/746

(58) Field of Classification Search .................. None
See application file for complete search history.

(56) References Cited

U.S. PATENT DOCUMENTS

| | | | |
|---|---|---|---|
| 6,360,271 B1 * | 3/2002 | Schuster et al. | 709/231 |
| 6,587,985 B1 * | 7/2003 | Fukushima et al. | 714/748 |
| 6,792,470 B2 * | 9/2004 | Hakenberg et al. | 709/232 |
| 7,315,898 B2 * | 1/2008 | Kohno | 709/230 |
| 7,386,872 B2 * | 6/2008 | Shimizu | 725/105 |
| 2002/0031125 A1 * | 3/2002 | Sato | 370/394 |
| 2002/0154600 A1 * | 10/2002 | Ido et al. | 370/216 |

\* cited by examiner

*Primary Examiner*—Wing F Chan
*Assistant Examiner*—Brian Roberts
(74) *Attorney, Agent, or Firm*—Dalina Law Group, P.C.

(57) ABSTRACT

An Automatic Repeat request (ARQ) error correction method optimized for protecting real-time audio-video streams for transmission over packet-switched networks. Embodiments of this invention provide bandwidth-efficient and low-latency ARQ for both variable and constant bit-rate audio and video streams. Embodiments of this invention use timing constraints to limit ARQ latency and thereby facilitate the use of ARQ packet recovery for the transport of both constant bit rate and variable bit rate media streams.

20 Claims, 2 Drawing Sheets

First 8 bytes of RTP header (RFC 3550)

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P|X|  CC   |M|     PT      |       sequence number         |
+-+-+-+-+-+-+-+-+-+-+-+-+-+-+-+-+-+-+-+-+-+-+-+-+-+-+-+-+-+-+-+-+
|                           timestamp                           |
+-+-+-+-+-+-+-+-+-+-+-+-+-+-+-+-+-+-+-+-+-+-+-+-+-+-+-+-+-+-+-+-+
```

LOW-LATENCY AUTOMATIC REPEAT REQUEST PACKET RECOVERY MECHANISM FOR MEDIA STREAMS

This application takes priority from U.S. Provisional Patent Application Ser. No. 60/629,509, entitled "LOW-LATENCY AUTOMATIC REPEAT REQUEST PACKET RECOVERY MECHANISM FOR MEDIA STREAMS", filed Nov. 18, 2004 which is hereby incorporated herein by reference.

BACKGROUND OF THE INVENTION

1. Field of the Invention

Embodiments of the invention relate generally to the implementation of a packet recovery mechanism for the robust transport of live and real-time media streams over packet-switched networks. Such media streams may consist of an audio and a video component or any combination of audio or video or other time-sensitive signals. The packet-switched network may include Internet connections and IP networks in general. More specifically, such embodiments relate to Automatic Repeat reQuest (ARQ) mechanisms optimized for robust, low-latency, and bandwidth-efficient transport of audio and video streams over packet-switched networks.

2. Description of the Related Art

Random congestion through packet-switched networks, such as the Internet, adds an unpredictable amount of jitter and packet loss to the transport of video and audio packet streams. Furthermore the most efficient video compression, variable bit-rate (VBR) coding, produces large bursts of data that further add to network congestion, compounding potential router queue overflow and the resulting packet loss. Thus, the number of packets that a network might drop and the instantaneous packet rate may fluctuate greatly from one moment to the next.

In addition to contending with packet delivery problems, maintaining low latency is a critical constraint for video conferencing and other applications having interaction between the viewer and subject. Some examples of applications where low-latency is critical are: security, where an operator may desire to control the pan/tilt/zoom of a remote camera to follow activity; and videoconferencing, to enable more fluid and natural conversations.

Automatic Repeat ReQuest (ARQ) provides a resilient and adaptable method for correcting packet loss in IP networks, especially as compared with forward error correction (FEC). ARQ is an integral quality of service (QoS) component of the ISO High-level Data Link Control (HDLC) communications standard [1] [2]. ARQ detects missing packets at a receiver and requests the transmitter to resend the missing packets. Various forms of ARQ have been applied to data packet transmission to help minimize the adverse impact of channel impairments on packetized data. Advantages of ARQ over other error correction mechanisms include its adaptability and resilience in correcting random and dynamically varying channel conditions.

The most commonly used transmission control protocol for robust packet transmission in IP networks is the Transmission Control Protocol (TCP) as described in RFC793 [3]. The United States' Advanced Research Project Agency (ARPA) first implemented TCP in the ARPANET network, the precursor to the Internet, as a mechanism for improving the reliability of packetized data transmission over otherwise unreliable network connections. TCP implements a form of positive-acknowledgement continuous ARQ, since it requires a return packet acknowledging the receipt of packets over a time window of transmitted packets. The main design goal for TCP was to provide robust transmission of data over unreliable links and in the presence of network congestion. TCP introduces variable latency and has a mechanism for throttling back transmission rates as congestion increases.

However, conventional ARQ and TCP protocols do not address the transmission requirements for real-time multi-media signals, where a packet's late arrival is equivalent to dropping that packet altogether. For real-time audio and video, packets must be rendered as a sequential isochronous data stream. Consequently, all packets must arrive before the signal is rendered and output to the user. In particular, after a video or audio segment has played out, the late arrival of an earlier missing packet can no longer be used in the signal presentation. Robust transmission for real-time multi-media streams therefore requires that, in addition to recovering any lost packets, packets must meet hard latency deadlines and follow strict sequence ordering.

None of the aforementioned art discusses ARQ techniques that limit latency in general, and certainly does not address robust transport for VBR streams, where the receiver may have to wait for a variable number of packets before it can request retransmission of missing packets to restore a stream. Audio packets must maintain a precise timing relationship with associated video packets to preserve lip-sync. The aforementioned art also does not address such issues when the media stream also includes audio packets. There is no known published work disclosing retransmission mechanisms that have been designed to preserve live media streams or that can provide assurances that recovered media packets can arrive in time and in the correct order to be properly rendered.

Forward Error Correction (FEC) provides an alternative to ARQ for the recovery of lost and corrupted packets. The Pro-MPEG Forum (www.pro-mpeg.org), an association of broadcast industry companies and professionals, has agreed upon an FEC standard for video over IP networks [5]. Pro-MPEG FEC is based in large part upon IETF RFC2733 that interleaves data packets into a two-dimensional array and generates parity packets among the packets in each row and column for providing forward error correction. The single parity packet of each row and column protects only a single packet loss from the corresponding row or column. However, interleaving data into a row and column array gives Pro-MPEG FEC the ability to protect against a contiguous loss of short sequences of packets within a media stream. This burst-drop protection is the most significant characteristic of Pro-MPEG FEC.

However, this protection comes at the cost of additional throughput overhead and significant added latency. For example, in order to protect against 100 milliseconds of contiguous packet loss, such as may occur during a dynamic rerouting or a switchover of routes when a router fails, and assuming FEC with 20% throughput overhead, Pro-MPEG FEC introduces 500 milliseconds of latency.

BRIEF SUMMARY OF THE INVENTION

Embodiments of the invention apply a modification of a selective repeat, continuous ARQ error correction mechanism to audio, video, and other real-time signal streams to enable their robust, low-latency transport over packet-switched networks. In particular, embodiments of the invention may delay the delivery of received packets and may constrain the retransmission timeout duration in order to minimize and bound any latency or jitter added by ARQ packet recovery. Some embodiments may place strict bounds on ARQ latency by synchronizing clocks between a transmitting node and a receiving node to more precisely calibrate the timing of retransmission requests and timeouts for minimizing latency. The enforcement of timing constraints on the packet recovery period, request timing, packet delivery, and other aspects of the ARQ mechanisms of the invention enable embodiments of the invention to transport both constant bit rate streams (CBR) as well as variable bit rate (VBR) streams, and to also maintain lip synchronization among associated audio and video signals.

DETAILED DESCRIPTION OF THE INVENTION

Embodiments of the invention apply a modification of a selective repeat, continuous ARQ error correction mechanism to packet streams containing audio, video, and other real-time signals, thereby enabling their robust, low-latency transport over packet-switched networks. In particular, embodiments of the invention apply time-based constraints in order to minimize and bound latency and jitter added by ARQ packet recovery. Some embodiments may tighten bounds on ARQ latency by synchronizing clocks between a transmitting node and a receiving node to more precisely calibrate the timing constraints. However, embodiments not requiring minimal latency and precise clock synchronization may instead simply rely on free-running local time references.

The enforcement of timing constraints, such as those on packet delivery timing, request timing, stale-dating, and other aspects of ARQ mechanisms enable embodiments of the invention to transport both constant bit rate streams (CBR) as well as variable bit rate (VBR) streams. Since VBR streams are comprised of piecewise CBR streams, the timing constraints of embodiments of the invention may be dynamically varied to optimize and adapt to bit-rate changes. The enforcement of the timing constraints may also help maintain synchronization among related real-time packet streams, such as lip-sync between audio and video.

Figure 1:
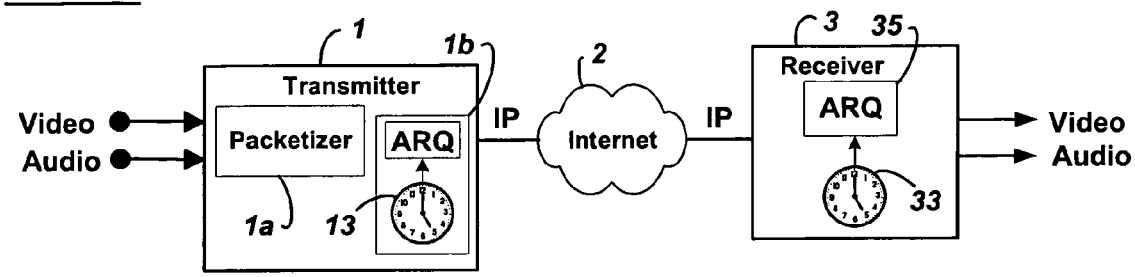
FIG. 1. System diagram showing a transmitting node sending audio and video via the Internet to an independent receiving node. The receiving node includes an up-channel automatic retransmission request (ARQ) mechanism to request packets lost in transit and a queuing means capable of restoring sequencing order and packet timing for recovered packet streams. The transmitting node includes a packet store and an ARQ retransmission mechanism responsive to ARQ requests.

In an embodiment shown in FIG. 1, audio and video signals enter a Transmitting Node 1, where they are packetized and sent via an IP network, such as the Internet 2, to a Receiving Node 3. Receiver 3 receives these audio and video packets and then converts them back into audio and video signals suitable for rendering. However, along the route from transmitter to receiver packets traveling along an IP Network 2, especially long-haul wide-area networks and wireless networks, may encounter poor link quality, congestion and other types of network impairments and may fail to arrive at their destination.

The embodiment in FIG. 1 helps protect against packet loss through the implementation of cooperating ARQ mechanisms at Transmitter 1 and Receiver 3 that detect and retransmit lost packets, thereby restoring packet loss at Receiver 3. This ARQ mechanism helps insure the integrity of the media stream delivered to Receiver 3, not only by recovering lost packets, but also by reinserting them into the proper sequence in the resulting output stream and by insuring proper output stream timing.

Figure 2:
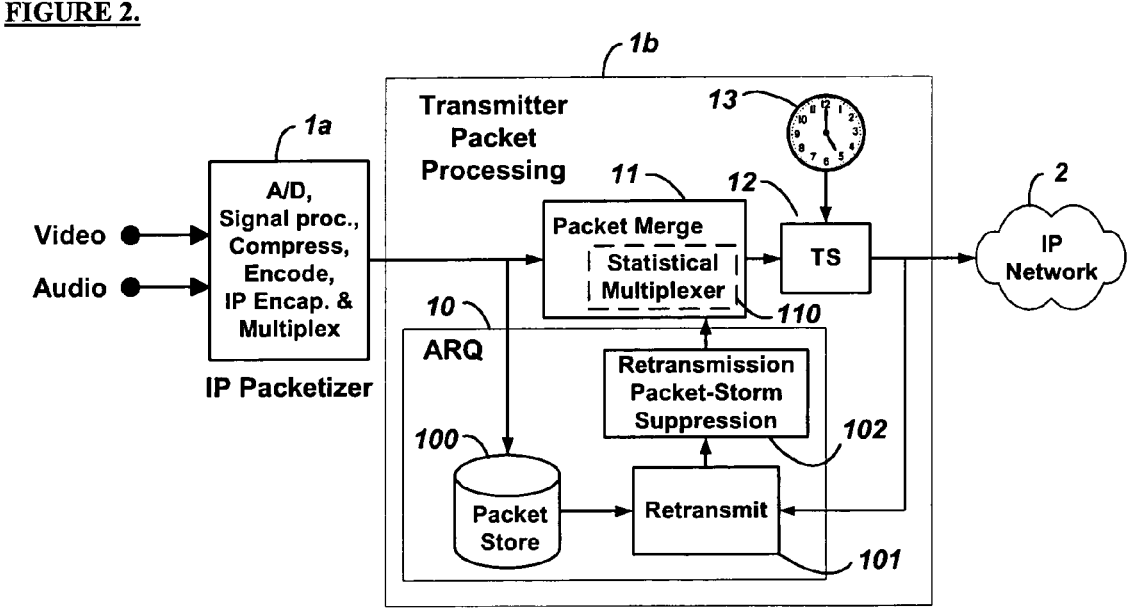
FIG. 2. Block diagram showing one embodiment of an ARQ packet storage and retransmission mechanism in a transmitting node that uses a local clock to time stamp outgoing packets and to prevent the retransmission of stale packets.

FIG. 2 provides additional detail for one embodiment of the ARQ mechanism at Transmitter 1. Anticipating the need to retransmit lost packets, ARQ Processor 10 within Transmitter Packet Processing unit 1b stores outgoing packets at Packet Store 100. Retransmit Processor 101 responds to retransmission request packets sent by ARQ Recovery Engine 35 at Receiver 3 by fetching the requested packets from Packet Store 100 and merging them into the packet stream at Packet Merge Unit 11. A basic embodiment of Packet Merge Unit 11 may simply queue packets from both the original packet stream and ARQ Processor 10 on a first-come first-served basis.

Packet loss is generally random, and therefore the associated ARQ packet retransmission is also random, adding a random variability to the preexisting network loading of the media packet stream. To smooth out and make more nearly constant the loading of the output of Transmitter 1 on IP Network 2, Packet Merge Unit 11 may include an optional Statistical Multiplexer 110. A statistical multiplexer buffers multiple streams of packets as it combines them into a single stream in order to smooth out packet bursts and output a more even packet flow.

Retransmission bursts, especially when added to the ongoing media stream and in the absence of Statistical Multiplexer 110, may cause temporal overloading of the network and of itself introduce additional packet loss. This additional packet loss will likely result in additional packet retransmission and therefore yet further retransmission loading on the network. This additional loading may cause further cycles of packet loss and retransmission resulting in packet storms that decrease ARQ effectiveness. To help prevent this positive feedback cycle of instability, embodiments may include a Retransmission Packet Storm Suppression Unit 102. Simple examples of embodiments for the Retransmission Packet Storm Suppression Unit 102 include the temporary suspension of retransmissions when the transmission level exceeds a preset threshold, such as a fixed percentage of the network link capacity. Alternately, it may just limit retransmissions to a preset peak rate.

Before being output to IP Network 2, a Timestamp (TS) Unit 12 inserts the time of a Local Clock 13 into each packet. This timestamp becomes the basis for determining when a packet can be considered missing or when a packet request becomes stale, along with other time-specific constraints related to the transport of media streams. Local Clock 13 may be free-running. Alternately, it may be synchronized to the incoming packet stream that has been digitized and processed by Packetizer 1a. Or, it may be synchronized to another remote clock, such as the clock at Receiver 3. Packetizer 1a may provide minimal signal processing, such as just signal digitization and encapsulation into a packet stream. Alternatively, Packetizer 1a may also include signal compression, encryption, and other types of signal encodings.

Figures 3, 4:
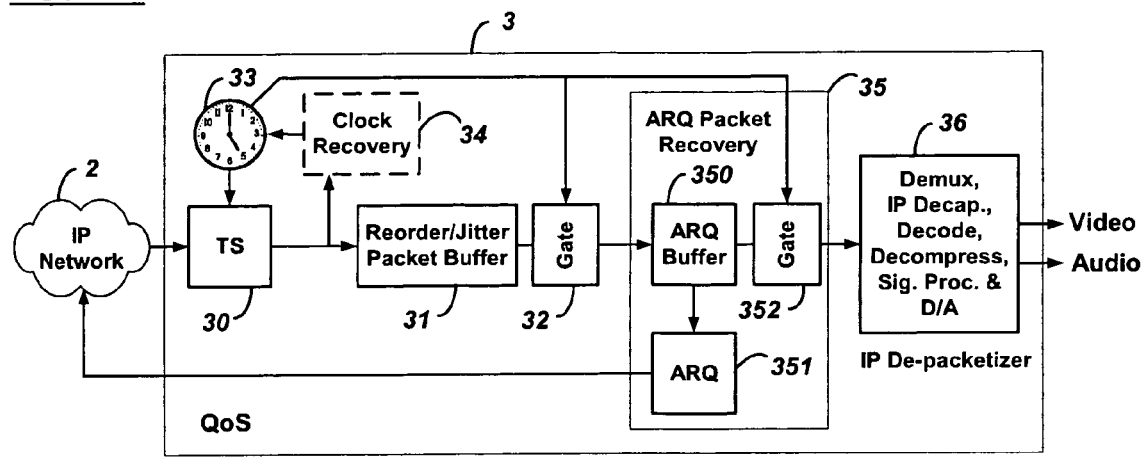
FIG. 3. Block diagram of the receiving node components of one embodiment of the ARQ of the invention. In this embodiment, a receiving node contains an ARQ Packet Recovery Engine to detect missing packets and an upstream packet request generator with an optional clock recovery mechanism to synchronize the packet request with a remote clock on the transmitter. Also included are queuing and gating means capable of restoring proper order and packet timing to the packets of recovered media streams.
FIG. 4. Packet header diagram showing first 8 bytes an RTP packet header for an embodiment where media data is encapsulated as RTP/UDP/IP packets.

FIG. 3 provides further detail for one embodiment of ARQ recovery processing for Receiver 3. Upon arrival at Receiver 3, Timestamp Unit 30 associates a timestamp of the present time according to Local Clock 33 with each incoming packet received from IP Network 2. Some embodiments may include Clock Recovery mechanism 34 to synchronize Local Clock 33 to Remote Transmitter Clock 13 in order to provide tighter tolerances on ARQ timing and thereby reduce ARQ latency.

After time-stamping, Reorder/Jitter Packet Buffer 31 holds and delays the outputting of each incoming packet in order to allow time for any out-of-order packets to arrive in time to be inserted into their proper sequence. Gate 32 controls this delay. Controlled by Local Clock 33, Gate 32 adds a fixed delay to the packet timestamp and uses this time, as compared with Local Clock 33, to control the release of each packet to ARQ Packet Recovery Engine 35. This additional fixed delay is calculated provide a tolerance to compensate for dynamic routing delays that may cause packets to arrive out of sequence. As a result, packets arriving at ARQ Packet Recovery Engine 35 should arrive in their proper order.

Because the operation of Reorder/Jitter Packet Buffer 31 and Gate 32 has restored proper packet order, ARQ Recovery Engine 35 can look for gaps in the sequence numbers of incoming packets in order to detect lost packets at Receiver 3, and as a result, send retransmission request packets to Transmitter 1. ARQ Buffer 350, in conjunction with Gate 352, further delays the output of packets to provide sufficient time for a retransmission request to be fulfilled by ARQ Processing Unit 10 at Transmitter 1 and to receive the retransmitted packet at ARQ Buffer 350. ARQ Buffer 350 inserts the recovered packet into its proper sequencing within the packet stream by the time that Gate 352 releases the packet to be de-capsulated and rendered at an output by IP De-packetizer 36.

The maximum packet storage size of ARQ Buffer 350 may be computed as:

$$S_{ARQ} = (T_{Burst} + R * T_{RoundTrip}) / T_{Packet}$$

where:
S$_{ARQ}$=total storage capacity of ARQ Buffer 10 in terms of the number of maximum-sized packets stored;
R=number of retransmission retries to be attempted;
T$_{RoundTrip}$=Round-trip packet transport time in seconds;
T$_{Burst}$=Maximum recoverable burst drop in seconds;
T$_{Packet}$=8 * Maximum packet size in bytes / Stream bit rate in bits per second.

It takes T$_{RoundTrip}$ seconds for each retransmit request to travel from Receiver 3 to Transmitter 1 and then for the retransmitted packet to travel back to Receiver 3. It may be desirable to attempt more than one request in order to overcome possible losses in the network of the packet requests and the recovered packet itself. Here R is the number of retransmission attempts to be attempted. Thus if we only assume random single packet drops for now (T$_{Burst}$=0), R * T$_{RoundTrip}$ is the time that Gate 352 must delay received packets to allow time for their recovery, and T$_{packet}$ translates that amount of time to a storage capacity in terms of packets. To recover a contiguous sequence of packets dropped by IP Network 2, then ARQ Buffer 350 and the associated delay at Gate 352 must be increased by the time represented by the desired burst coverage size, T$_{Burst}$, as represented in the above formula. In this case of multiple contiguous dropped packets, Gate 352 must hold off delivery of the received packet stream from IP Depacketizer 36 in order to give the ARQ recovery system a chance to detect, request, and receive the block of lost packets. This additional hold-off time of T$_{Burst}$ helps insure that a jitter-free and error free continuous packets stream is fed to IP Depacketizer 36. We denote this additional time as T$_{Burst}$.

In this case of burst drop, ARQ can be significantly more efficient than forward error correction (FEC). For example, assume 2 ARQ retries (R=2) and 40 milliseconds round-trip transit time (T$_{RoundTrip}$=40 ms.). If the burst drop protection (T$_{Burst}$) is to be 100 ms, then as previously mentioned, a Pro-MPEG FEC [5] implementation configured with 20% throughput overhead would add approximately 500 ms of latency (neglecting transmission time for the 20% overhead), but ARQ latency from an embodiment of the invention is approximately 100+(2×40) or 180 ms (neglecting the effects of finite transmission time).

Each retransmission request packet contains a list of packets detected as missing from the stream being input to Receiver 3. Because of losses in IP Network 2, not all request packets sent upstream by Receiver 1 necessarily arrive at Transmitter 1. Therefore, ARQ Processor 10 in Receiver 3 may send replicate or overlapping retransmission requests to Transmitter 1. Embodiments may continuously augment the list of lost packets and create a new retransmission request packet from this list each time the ARQ Packet Recovery Engine 35 detects another missing packet.

As previously mentioned, in order to help determine whether a packet is missing, Transmitter 1 inserts an incrementing sequence number into each media packet before transmission. To further help determine whether a packet is missing, to also help bound the retransmission time, and to help in stream clock recovery or to match transmit packet rate to the receive clock, Transmitter 1 may add a timestamp to each outgoing packet. FIG. 4 shows one example of a packet header using RTP protocol [4] that includes fields to store such information, including payload type (PT), sequence number, and timestamp data in each packet.

A packet can be determined as missing when a new packet arrives at Receiver 3 having a gap in sequence numbering that skips over one or more sequence numbers. In addition, and in order to insure faster notification and redelivery of lost packets in an isochronous stream of packets, embodiments may determine that a packet is missing using a timeout mechanism. For example, knowing the inter-packet arrival time in an isochronous packet stream, a timeout can be set for a time interval slightly longer than this gap, long enough to account for reasonable amounts of inter-arrival packet jitter and other packet timing variations. Triggering this timeout can result in a retransmission request before it might otherwise be detected by a sequence number gap from a successive packet that may arrive in the future. Even if the "missing" packet were to arrive later, the retransmitted packet would simply be discarded in Reorder/Jitter Packet Buffer 31 as a duplicate packet. In general, the incremental network loading due to redundant packet retransmissions can be limited and may provide a reasonable tradeoff in exchange for shortened recovery latencies.

Some embodiments may keep a running list of all not-yet-received missing packets and add new missing packets to this list. Retransmission request packets can then include this entire list each time a new request packet is sent out to provide additional redundancy and robustness to an implementation. The ARQ Recovery Engine can limit the size of these retransmission request lists to be within a pre-specified limit and thereby limit the size of retransmission bursts. Also, the ARQ Retransmit mechanism 101 can include a mechanism to limit throughput to help avoid unstable behavior.

While many possible embodiments for Clock Recovery 32 are possible, for reference some possible embodiments for implementing Clock Recovery 32 are described in United States Provisional Patent Application entitled "METHOD FOR CLOCK SYNCHRONIZATION OVER PACKET-SWITCHED NETWORKS" filed Jul. 19, 2004, Ser. No. 60/521,904 which is hereby incorporated herein by reference. Furthermore, Clock 33 of a Receiver 3 need not be precisely synchronized to Clock 13 of Transmitter 1. Embodiments of the invention may omit clock recovery mechanism 32, particularly when the free-running frequency of Clock 33 is substantially close to the frequency of Clock 13 in Transmitter 1.

It should be understood that the programs, processes, methods, systems and apparatus described herein are not related or limited to any particular type of computer apparatus (hardware or software), unless indicated otherwise. Various types of general purpose or specialized computer apparatus may be used with or perform operations in accordance with the teachings described herein.

In view of the wide variety of embodiments to which the principles of the invention can be applied, it should be understood that the illustrated embodiments are exemplary only, and should not be taken as limiting the scope of embodiments of the invention. For example, the transmitter and receiver implementations of FIGS. 2 and 3 may implement components in an order other than those described, and more or fewer elements or components may be used in the block diagrams. In addition, the present invention can be practiced with software, hardware, or a combination thereof.

The claims should not be read as limited to the described order or elements unless stated to that effect. Therefore, all embodiments that come within the scope and spirit of the following claims and equivalents thereto are claimed as the invention.

REFERENCES (1) "Information technology—Telecommunications and information exchange between systems—High-level data link control (HDLC) procedures," ISO/IEC 13239:2002, URL:http://www.iso.org/iso/en/CatalogueDetailPage.CatalogueDetail?CSNUMBER=37010&ICS1=35&ICS2=100&ICS3=20, International Organization for Standardization (ISO), 2002.

(2) A. Al-Zoman, J. DeDourek, and B. Kurz, "Automatic Retransmission Rather than Automatic Repeat Request," URL: http://www.ieee-icnp.org/1994/papers/1994-6.pdf, International Conference on Network Protocols, Institute of Electronics and Electrical Engineers (IEEE), 1994.

(3) J. Postel, "Transmission Control Protocol," RFC793, Std. 7, URL: http://www.ietf.org/rfc/rfc793.txt?number=793, Network Working Group of the Internet Engineering Task Force (IETF), The Internet Society, September 1981.

(4) H. Schulzrinne et. al., "RTP: A Transport Protocol for Real-Time Applications," RFC3550, URL: http://www.ietf.org/rfc/rfc3550.txt?number=3550, Network Working Group of the Internet Engineering Task Force (IETF), The Internet Society, Jul. 1993.

(5) P. Elmer, "Pro-MPEG Forum code of Practice #3 Transmission of Professional MPEG-2 transport streams over IP networks," URL: http://www.pro-mpeg.org/publicdocs/pdf/Vid-on-IP-CoP3-issue1.pdf, Pro-MPEG Forum, WAN Group, Mar. 4, 2003.

What is claimed is:

1. A low-latency automatic repeat request packet recovery system for media streams comprising:
    a packet store module configured to store at least one packet from a packet stream;
    a retransmit module configured to fetch said at least one requested packet from said packet store module;
    a timestamp unit configured to timestamp a local clock time in a transmission packet in said modified packet stream;
    said packet store module and said retransmit module comprising an automatic repeat request module;
    said automatic repeat request module and said timestamp unit comprising a transmitter packet processing module;
    a receiver timestamp unit configured to timestamp an incoming packet using a receiver local clock;
    a reorder/jitter packet buffer module configured to hold said incoming packet for an amount of time to allow for out-of-order packets to arrive in time for proper sequence insertion;
    a gate configured to add a fixed delay to a packet timestamp and compare said time stamp with said receiver local clock to control a release time for a received packet;
    a receiver automatic repeat request packet recovery module configured to receive said received packet, detect gaps in sequence number, and request lost packets from said transmitter packet processing module by sending a retransmission request;
    a recovered stream hold-off gate configured to delay, by a fixed time synchronized to a recovered transmit clock, an output of any packets from said receiver to allow output of a jitter-free and error free ordered and continuous stream of packets;
    said receiver timestamp unit, said reorder/jitter packet buffer module, said gate and said receiver automatic repeat request packet recovery module comprising a receiver module; and,
    said transmitter packet processing module configured to transmit said modified packet stream to said receiver module.

2. The system of claim 1 further comprising a packet merge unit which comprises a statistical multiplexer configured to buffer multiple streams of packets into a single stream to limit packet burst.

3. The system of claim 1 further comprising a retransmission packet-storm suppression module configured to temporarily suspend retransmission when a transmission level exceeds a threshold wherein said retransmission packet-storm suppression module is also configured to send at least one requested packet wherein said threshold comprises a fixed percentage of a network link capacity.

4. The system of claim 1 wherein said local clock is synchronized with a receiver local clock.

5. The system of claim 1 wherein receiver module comprises a clock recovery module configured to recover a clock value.

6. The system of claim 1 wherein transmitter packet processing module comprises an IP packetize.

7. The system of claim 1 wherein receiver module comprises an IP de-packetizer.

8. A method for utilizing a low-latency automatic repeat request packet recovery mechanism for media streams comprising:
    storing at least one packet from a packet stream in a packet store module;
    fetching at least one requested packet via a retransmit module from said packet store module;

outputting a modified packet stream;
timestamping a local clock time in a transmission packet in said modified packet stream via a timestamp unit;
coupling said packet store module and said retransmit module to form an automatic repeat request module;
coupling said automatic repeat request module and said timestamp unit to form a transmitter packet processing module;
timestamping an incoming packet via a receiver timestamp unit using a receiver local clock;
holding said incoming packet in a reorder/jitter packet buffer module for an amount of time to allow for out-of-order packets to arrive in time for proper sequence insertion;
adding a fixed delay to a packet timestamp via a gate and comparing said time stamp with said receiver local clock to control a release time for a received packet;
receiving said received packet from said transmitter packet processing module via a receiver automatic repeat request packet recovery module, detecting gaps in sequence number, and requesting lost packets from said transmitter packet processing module by sending a retransmission request;
delaying via a recovered stream hold-off gate a fixed time synchronized to a recovered transmit clock, an outputting of any packets from said receiver to allow output of a jitter-free and error free ordered and continuous stream of packets;
coupling said receiver timestamp unit, said reorder/jitter packet buffer module, said gate and said receiver automatic repeat request packet recovery module to form a receiver module; and,
transmitting said modified packet stream to said receiver module from said transmitter packet processing module.

9. The method of claim 8 further comprising:
suspending retransmission via a retransmission packet-storm suppression module when a transmission level exceeds a threshold;
sending said at least one requested packet to said retransmission packet-storm suppression module; and,
accepting said packet stream and said retransmission packet stream via a packet merge module.

10. The method of claim 9 further comprising setting said threshold to a fixed percentage of a network link capacity.

11. The method of claim 8 further comprising coupling a packet merge unit to a statistical multiplexer configured to buffer multiple streams of packets into a single stream to limit packet burst.

12. The method of claim 8 further comprising synchronizing said local clock with a receiver local clock.

13. The method of claim 8 recovering a clock value in said receiver module via a clock recovery module.

14. The method of claim 8 further comprising coupling said transmitter packet processing module comprises with an IP packetizer.

15. The method of claim 8 further comprising coupling said receiver module with an IP de-packetizer.

16. A system for utilizing a low-latency automatic repeat request packet recovery mechanism for media streams comprising:
means for storing at least one packet from a packet stream in a packet store module;
means for fetching at least one requested packet via a retransmit module from said packet store module;
means for outputting a modified packet stream;
means for timestamping a local clock time in a transmission packet in said modified packet stream via a timestamp unit;
means for coupling said packet store module and said retransmit module to form an automatic repeat request module;
means for coupling said automatic repeat request module and said timestamp unit to form a transmitter packet processing module;
means for timestamping an incoming packet via a receiver timestamp unit using a receiver local clock;
means for holding said incoming packet in a reorder/jitter packet buffer module for an amount of time to allow for out-of-order packets to arrive in time for proper sequence insertion;
means for adding a fixed delay to a packet timestamp via a gate and comparing said time stamp with said receiver local clock to control a release time for a received packet;
means for receiving said received packet from said transmitter packet processing module via a receiver automatic repeat request packet recovery module, means for detecting gaps in sequence number, and means for requesting lost packets from said transmitter packet processing module by sending a retransmission request;
means for delaying via a recovered stream hold-off gate a fixed time synchronized to a recovered transmit clock, and means for outputting of any packets from said receiver to allow output of a jitter-free and error free ordered and continuous stream of packets;
means for coupling said receiver timestamp unit, said reorder/jitter packet buffer module, said gate and said receiver automatic repeat request packet recovery module to form a receiver module; and,
means for transmitting said modified packet stream to said receiver module from said transmitter packet processing module.

17. The system of claim 16 further comprising:
means for suspending retransmission via a retransmission packet-storm suppression module when a transmission level exceeds a threshold;
means for sending said at least one requested packet to said retransmission packet-storm suppression module; and,
means for accepting said packet stream and said retransmission packet stream via a packet merge module.

18. The system of claim 16 further comprising means for coupling a packet merge unit to a statistical multiplexer configured to buffer multiple streams of packets into a single stream to limit packet burst.

19. The system of claim 17 further comprising means for setting said threshold to a fixed percentage of a network link capacity.

20. The system of claim 16 further comprising means for synchronizing said local clock with a receiver local clock.

* * * * *